UNITED STATES PATENT OFFICE.

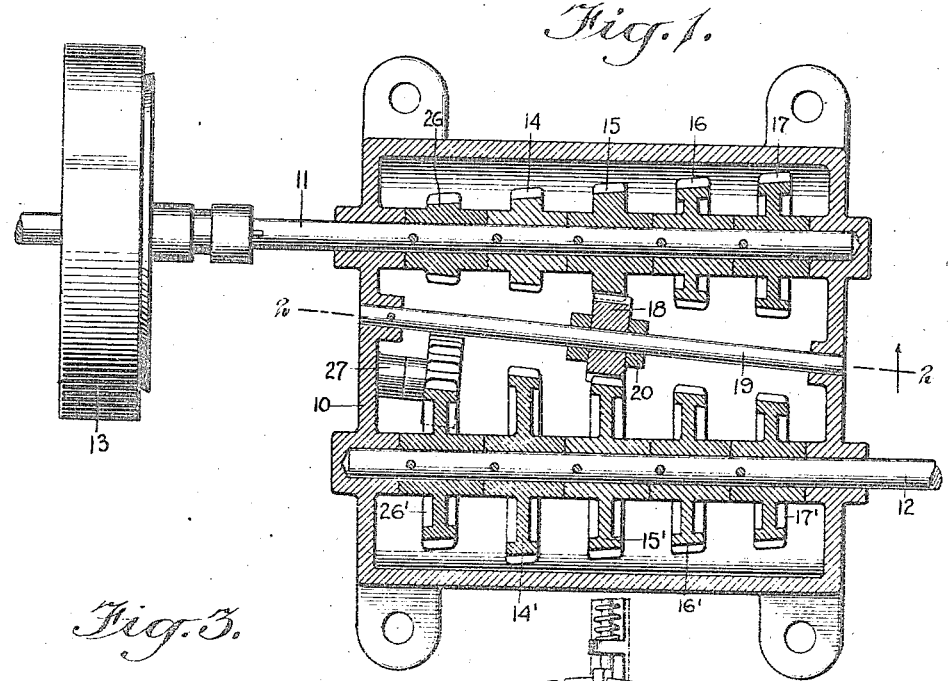
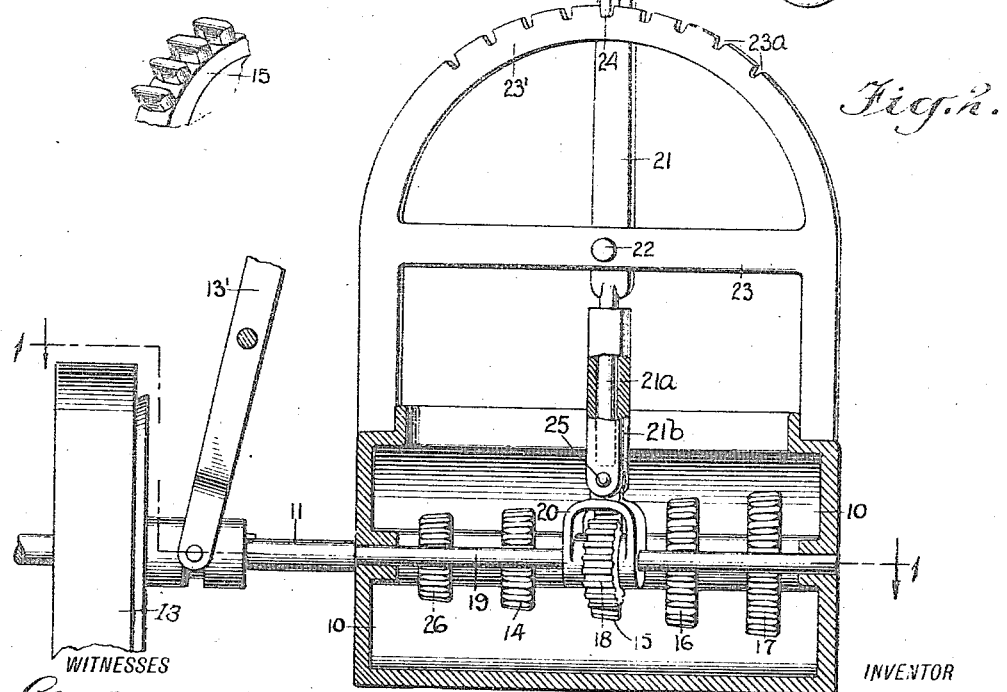

RICHARD W. COMPTON, OF HIGBEE, MISSOURI.

CHANGE-SPEED GEARING.

1,169,618. Specification of Letters Patent. Patented Jan. 25, 1916.

Application filed December 19, 1914. Serial No. 878,066.

*To all whom it may concern:*

Be it known that I, RICHARD W. COMPTON, a citizen of the United States, and a resident of Higbee, in the county of Randolph and State of Missouri, have invented a new and Improved Change-Speed Gearing, of which the following is a full, clear, and exact description.

This invention relates to machine elements and has particular reference to gearing adapted for automobiles or other machinery where a change from one speed to another is desired or where varying speeds in one direction may be provided for in addition to the reverse drive.

Among the objects of the invention is to simplify mechanism of this character whereby an efficient change of speed may be provided for with a comparatively few number of parts in a simple manner.

More definitely stated, my improvement includes a casing in which are housed the principal change speed elements including a series of gears of varying sizes secured to one shaft and another series of gears of varying sizes arranged inversely to those of the first series and connected to another shaft, and an idler transmitting pinion movable between said series of gears and adapted to transmit rotation from one element of each series to the corresponding opposite element of the other series, special means being provided to control the movement and position of said idler gear.

The foregoing and other objects of the invention will hereinafter be more fully described and claimed and illustrated in the drawings forming a part of this specification in which like characters of reference indicate corresponding parts in all the views, and in which—

Figure 1 is a horizontal sectional view on the line 1—1 of Fig. 2; Fig. 2 is a vertical sectional view of the same on the line 2—2 of Fig. 1; and Fig. 3 is a detail of one of the gear elements showing a preferred form of the teeth.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings I show at 10 a gear casing of any suitable size, form or construction, having journaled therein a pair of shafts preferably parallel to each other, and for the sake of explanation the shaft 11 may be regarded as the driving shaft and the shaft 12 as the driven shaft. The shaft 11 is adapted to be rotated continuously in a certain direction by any suitable prime mover (not shown), such as a gasolene engine or the like, through a suitable clutch 13, herein shown as of a friction type, and controlled by a foot lever 13'.

Secured in any suitable manner to the driving shaft 11 are direct driving gears 14, 15, 16 and 17 constituting a series of varying size, the gear 14 being the smallest and providing for the slowest forward speed, while the gear 17 provides for the highest speed. The driven shaft has connected to it, in any suitable manner, corresponding gears 14' to 17' constituting another series of varying size but inversely arranged with respect to the direct driving gears opposite which they are arranged in pairs. The difference in diameter between any two adjacent gears of one series is equal substantially to the difference between the diameters of adjacent gears of the other series. In other words, the sum of the diameters of the two gears constituting each pair is the same as the sum of any other pair of gears.

The two series of gears referred to above are spaced from each other far enough to accommodate an idler pinion 18 slidable along a supporting rod 19 fixed at its ends in the side walls of the casing and parallel to the peripheries of the gears aforesaid. The pinion 18 is adapted to be shifted along this rod so as to connect the gears of each pair operatively. The means for shifting the pinion includes preferably a yoke 20 spanning the pinion 18 and having hubs through which the rod 19 projects and whereby the yoke is prevented from tilting in its own plane.

At 21 is shown a controlling lever pivoted at 22 on a bracket 23 secured to the casing 10 substantially in the aforesaid plane of the yoke and the axis of the rod 19. The bracket includes a segment 23' having a series of nine notches 23ᵃ with which a keeper 24 is adapted to engage to maintain the lever in a definite predetermined position. In other words, the segment is provided with as many notches as there are pairs of gears and spaces between adjacent pairs, whereby the pinion 18 may be locked either in engaging position or in an idle position out of engagement with the transmitting gears. The lower end of the lever 21 is provided with a telescopic section. In other words, the end of the lever 21ª is slidably fitted in a sleeve member 21ᵇ pivotally connected at its lower end at 25 in the yoke 20. Since the lever 21 is connected to the bracket so as to swing in a definite plane, the sleeve 21ᵇ is maintained by the part 21ª substantially in said plane and thereby the yoke 20 is held from lateral rotation or displacement from said plane and around the axis of the rod 19. As shown in Fig. 2, the lever is in its mid position and is shown holding the pinion in transmitting engagement with a pair of gears 15 and 15' whereby the machine will be given a forward drive at a certain speed. If the lever 21, however, be moved in either direction from the mid position, the parts 21ª and 21ᵇ will move apart slightly since the pivotal connection 25 between the sleeve and the yoke remains constant, the yoke following the rod 19. The swinging of the lever serves, therefore, to shift the pinion 18 along the rod 19 and the telescopic portion of the lever provides for constant operative connection between it and the yoke irrespective of the difference in length between the pivot 22 and yoke. In order to insure easy and certain slipping of the pinion into mesh with any of the other gears, certain of the teeth may be rounded on their edges as shown in Fig. 3.

Adjacent the first direct drive gear 14 is a gear 26 from which power is transmitted through the pinion 18 and a fixed idler 27 to a gear 26' secured to the driven shaft adjacent the gear 14' whereby the direction of operation of the machine is changed or reversed from that pertaining to the pair of gears 14 and 14', though at practically the same speed.

I claim:

1. In change speed gearing, the combination with a casing, a driving shaft and a driven shaft journaled in said casing, a series of different sized gear wheels secured to each of said shafts, a larger gear of each shaft being paired with a smaller gear of the other shaft, and spaced therefrom, of a fixed supporting rod secured at its ends to the casing, and located in the space between the two series of gear wheels, an idler pinion mounted to slide loosely along the fixed supporting rod, to make operative engagement between a gear on the driving shaft and a corresponding gear on the driven shaft, a yoke embracing said pinion and having hubs through which the fixed supporting rod projects, and a lever for controlling the position of the pinion, the lever having an adjustable section pivotally connected with said yoke.

2. In a change speed gearing, the combination with a casing, a driving shaft, and a driven shaft journaled in said casing, and a series of different sized gear wheels on each shaft and spaced apart, a larger gear of each shaft being paired with a smaller gear of the other shaft and spaced therefrom, of a supporting rod fixed at its ends in the side walls of the casing and extending in the space between the series of gear wheels, a pinion slidable loosely on the said fixed rod, the teeth of said gear wheels being shaped on their edges to insure easy mesh of the pinion with said gear wheels, a bracket arranged substantially in the plane of the axis of the fixed rod, the bracket having a segmental notched upper member terminating in side members secured to the sides of the casing, and a cross member connecting the side members, the notches of the segmental member of the bracket corresponding in number with the pairs of gear wheels and the spaces between adjacent pairs, a lever pivoted to the cross member of the bracket at the center thereof and movable substantially in the plane of the axis of said fixed rod, a yoke embracing the pinion and having hubs slidable loosely along said rod, the lower end of said lever having an adjustable section pivotally connected with said yoke, and the upper portion of said lever having a keeper adapted to engage the notches of said segment to lock the pinion in the predetermined position.

In testimony whereof I have signed my name to this specification in the presence of two subscribing witnesses.

RICHARD W. COMPTON.

Witnesses:
J. W. BLAKLEY,
H. SCOTT WELCH.